United States Patent [19]

Schmidt et al.

[11] 3,952,664

[45] Apr. 27, 1976

[54] ROCKET NOZZLE MULTI FUNCTION

[75] Inventors: Joseph A. Schmidt, Ridgecrest; W. James Stone, China Lake, both of Calif.

[73] Assignee: The United States of America as represented by the Secretary of the Navy, Washington, D.C.

[22] Filed: June 10, 1974

[21] Appl. No.: 478,009

[52] U.S. Cl. ............................ 102/89; 89/1 G; 244/122 AD
[51] Int. Cl.² ............... F42B 13/56; F42B 15/06
[58] Field of Search ....... 102/89, 49.7, 70, 70.2 A; 89/1 G; 60/256, 39.82 E; 244/122 AB, 122 AD, 141

[56] References Cited
UNITED STATES PATENTS

| | | | |
|---|---|---|---|
| 2,644,364 | 7/1953 | Nass | 102/49.7 X |
| 2,751,171 | 6/1956 | Martin | 244/141 |
| 2,805,622 | 9/1957 | Canmin-Christy | 102/89 |
| 3,388,666 | 6/1968 | Walther | 102/49.7 X |
| 3,570,405 | 3/1971 | Heady, Jr. | 102/49.7 X |
| 3,807,670 | 4/1974 | Suller | 244/122 AD |
| 3,885,452 | 5/1975 | Weinstock et al. | 244/122 AB |

*Primary Examiner*—Samuel W. Engle
*Assistant Examiner*—Harold Tudor
*Attorney, Agent, or Firm*—R. S. Sciascia; Roy Miller

[57] ABSTRACT

A rocket motor assembly for a rocket motor utilized for towing a load or extracting an aircrew member from an aircraft. The rocket motor is formed in two separate sections, a casing portion and a unitary nozzle igniter housing portion. The nozzle and igniter housing portion has a circumferential portion that mates with the internal surface wall of the casing portion. A seal and fastener holds the housing in place whenever the rocket motor is assembled. A shackle secured to the igniter mechanism is fastened to a tow line extending to a load to be towed.

1 Claim, 2 Drawing Figures

ROCKET NOZZLE MULTI FUNCTION

CROSS REFERENCE TO RELATED APPLICATIONS

Reference is made to assignee's copending applications Ser. Nos. 478,012, 478,010 now U.S. Pat. No. 3,893,367, 478,011 and 478,008) filed of even date that relate to rocket motor apparatus utilized for towing a load.

BACKGROUND OF THE INVENTION

1. Field of Invention

This invention relates to a unitary rocket nozzle and igniter housing for use in a rocket motor apparatus adapted to tow a load by means of a tow line fastened to the rear end of the rocket motor adjacent its nozzles.

2. Background of the Invention

An important feature of the unitary nozzle and igniter housing is that it allows the fabrication of a rocket motor casing and housing as separate items capable of assembly in the field. This has the advantage of permitting each unit to be shipped as separate complete items with the rocket nozzle housing, containing the igniter mechanism and the rocket casing containing the propellant. The two units can easily be assembled under field conditions with a minimum of know-how on the part of installation and maintenance personnel and with a minimum amount of tools. The housing and casing configuration permits a design that is inexpensive to fabricate in large or small quantities and which allows the interchanging of parts between rocket motors.

Due to the need in recent years for lighter, simpler and more effective rocket motors for providing a variety of tasks, for example carrying a line, towing a load or extracting a crew member to a safe distance from a disabled aircraft, it has been necessary to provide rocket motor apparatus that can be easily assembled and shipped under all types of environmental conditions.

Prior art techniques usually require the rocket motor to be assembled completely at the factory where fabricaed. This has led to the development of safing techniques to prevent the rocket motor from igniting during shipment and handling. Some of the safing techniques required have increased the complexity of the rocket motor structure and added to its overall weight.

The present unique nozzle housing structure is easily removable from the casing for inspection, assembly or maintenance. This overcomes the inherent disadvantages of a completely assembled rocket motor and permits the use of a small, simple lightweight rocket motor in line carrying or aircrew escape system apparatus.

SUMMARY OF INVENTION

A feature of the invention is to provide a unitary nozzle and igniter assembly for a rocket motor that is simple in structure and easy to fabricate.

The rocket nozzle housing is formed so as to be easily assembled in the field and permits individual packaging and shipping of the rocket casing containing the propellant and the nozzle housing as completely separate assembled units. The nozzle housing is constructed to position the igniter mechanism on the longitudinal centerline of the rocket motor between and adjacent to the rocket nozzle apertures. A booster charge is fastened to one end of the housing to be in close proximity to the propellant in the motor casing when the rocket motor is assembled. A sealing and locking means holds the housing rigidly within the rocket casing housing thereby allowing powered rocket flight without loss of internal motor pressure due to leakage between the rocket casing and nozzle housing when assembled.

Figure 1:
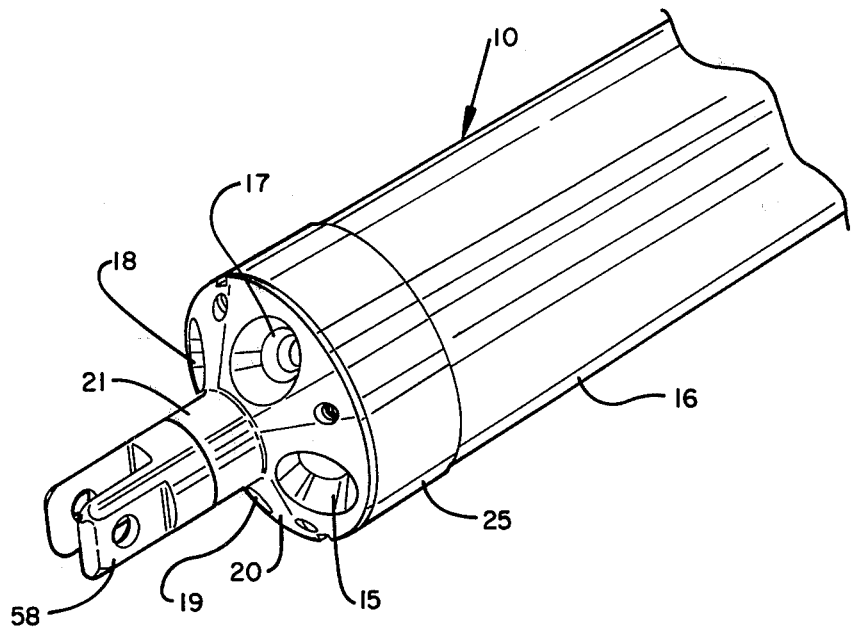
FIG. 1 is a prospective view of an assembled rocket motor.

Referring now to the drawing and in particular to FIG. 1, rocket motor 10 has a nozzle assembly 20 fitted in an end portion of casing 16. Casing 16 contains a high burn rate propellant for propelling rocket motor 10 during its powered flight along a predetermined trajectory.

Nozzle housing 20 has a machined cylindrical portion of lesser outside diameter than the internal diameter of a substantially thickened end portion at the mouth of casing 16. This thickened portion defines a flange 25 for strengthening the end of casing 16.

Figure 2:
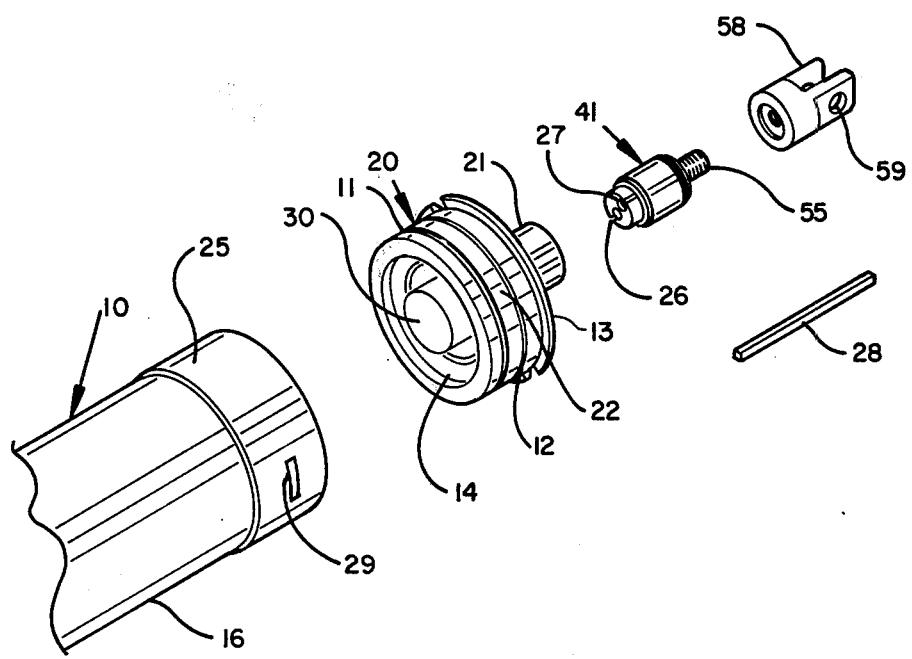
FIG. 2 is an exploded prospective view of the rocket motor with a partial disassembly of the rocket nozzle housing.

An intermediate portion of housing assembly 20 extending from shoulder 13 contains the nozzle apertures and is formed to taper down to a centrally located cylindrical boss 21 that extends a substantial distance along the longitudinal axis of the rocket motor. Boss 21 has an axial bore from its end-most portion that extends inward a substantial distance to define an igniter chamber. This chamber has two parallel bores spaced from the center of the boss to communicate with firing pin chambers 26 and 27 respectively of igniter assembly 41. These bores, not shown, communicate with the interior of a cup-like depression 14 machined in the face of the cylindrical portion of nozzle housing 20. Nozzle apertures 15, 17, 18 and 20 also extend from the outer conical surface section of nozzle housing 20 to the cup like depression 14 so as to communicate with the propellant within casing 16. As shown in FIG. 2, nozzle housing 20 has a gradually thickening wall ending at its thickest portion at the bottom of cup like depression 14.

Booster charge assembly 30 containing a high burn rate powder is positioned centrally of nozzle housing 20 and provides the necessary heat and flame during its combustion to ignite the rocket propellant carried in casing 10.

The outer circumferential surface of the cylindrical portion of housing assembly 20 has two circmferential grooves 11 and 12, respectively. Groove 11 is fitted with an O-ring to provide a seal against escape of rocket gases and groove 12 is fitted with a square shaped spring like wire 28 having a length equal to the circumference of the internal surface of groove 12 and sufficient thickness so as to mate with a circumferential groove, not shown, on the internal wall of flange 25.

The rocket nozzle assembly 20, when assembled, contains booster charge 30, igniter mechanism 41 and shackle 58 threaded on stud 55. This permits a compact assembly of the rocket motor 10 into two completely assembled units and allows the separate shipment of the rocket motor for safety purposes.

To assemble, rocket motor in the field the installation personnel fit nozzle housing assembly 20 within casing 16 and feed lock wire 28 through elongated hole 29, that is in communication with the internal groove in flange 25, until its length extends completely around the circumference. This provides a positive lock to hold the nozzle rigidly in place during powered rocket flight.

The unitary rocket nozzle housing design permits simple assembly or disassembly of a rocket motor to allow for safe transportation or maintenance.

Although the preferred embodiment has been described, it will be understood that within the purview of this invention various changes may be made in the form, details and proportion and arrangement of parts, the combination thereof and mode of operation, which generally stated, consists in a device capable of carrying out the features set forth, as disclosed and defined in the appended claims.

What is claimed is:

1. A rocket motor assembly having a cylindrical casing containing a rocket propellant for use with a rocket motor that is utilized for towing a load during powered flight by means of a tow line, the improvement comprising:

an integral removable cylindrical end portion having a generally conical portion with a base and an apex, a boss portion on the apex end, a generally cylindrical annular portion of a lesser diameter than the major diameter of the conical base section extending transversely outwardly from a plane parallel with the base of said conical portion to provide a protrusion that slidably fits within a rocket motor casing;

a circumferential flange portion formed by the intersection of the base of said conical section and an outer wall of said cylindrical annular portion;

four nozzle apertures opening on a tapered surface of said conical portion and extending through said conical portion so as to be in direct communication to an interior part of said cylindrical annular portion;

an igniter chamber formed by an axial bore extending a substantial distance into said boss portion;

igniter means adapted to fit in said igniter chamber;

shackle means connected to said igniter means for connecting said tow line to said rocket motor;

propellant booster container fastened within and concentric with the center of said cylindrical annular portion;

sealing means positioned on an outer circumferential surface of said cylindrical porton; and a locking groove on an outer circumferential surface of said cylindrical annular portion for rigidly fastening said cylindrical end portion to an interior portion of a rocket motor casing by means of a locking wire.

* * * * *